United States Patent
Michiels et al.

(10) Patent No.: US 8,700,915 B2
(45) Date of Patent: Apr. 15, 2014

(54) METHOD AND SYSTEM FOR VERIFYING AUTHENTICITY OF AT LEAST PART OF AN EXECUTION ENVIRONMENT FOR EXECUTING A COMPUTER MODULE

(75) Inventors: Wilhelmus Petrus Adrianus Johannus Michiels, Eindhoven (NL); Paulus Mathias Hubertus Mechtildis Antonius Gorissen, Eindhoven (NL)

(73) Assignee: Irdeto Corporate B.V. (NL)

( * ) Notice: Subject to any disclaimer, the term of this patent is extended or adjusted under 35 U.S.C. 154(b) by 1118 days.

(21) Appl. No.: 12/307,942

(22) PCT Filed: Jul. 4, 2007

(86) PCT No.: PCT/IB2007/052607
§ 371 (c)(1),
(2), (4) Date: Jan. 8, 2009

(87) PCT Pub. No.: WO2008/007305
PCT Pub. Date: Jan. 17, 2008

(65) Prior Publication Data
US 2009/0313480 A1    Dec. 17, 2009

(30) Foreign Application Priority Data
Jul. 12, 2006 (EP) .................................. 06117036

(51) Int. Cl.
*G06F 21/00* (2013.01)
(52) U.S. Cl.
USPC ............... 713/189; 726/23; 726/24; 713/159; 713/187; 709/224; 455/41

(58) Field of Classification Search
USPC .................................................. 713/187, 189
See application file for complete search history.

(56) References Cited

U.S. PATENT DOCUMENTS

| | | | |
|---|---|---|---|
| 7,020,772 B2 * | 3/2006 | England et al. ............... | 713/166 |
| 7,152,243 B2 * | 12/2006 | Bourne et al. ................ | 726/26 |
| 7,337,324 B2 * | 2/2008 | Benaloh et al. ............... | 713/182 |
| 7,827,612 B2 * | 11/2010 | Saito ............................. | 726/24 |
| 7,891,008 B2 * | 2/2011 | Fortune et al. ................ | 726/27 |
| 2001/0018738 A1 * | 8/2001 | Mori et al. .................... | 713/100 |
| 2002/0161996 A1 * | 10/2002 | Koved et al. .................. | 713/150 |

(Continued)

FOREIGN PATENT DOCUMENTS

| | | |
|---|---|---|
| FR | 2792141 A1 | 10/2000 |
| FR | 2867929 A1 | 9/2005 |

(Continued)

OTHER PUBLICATIONS

Stanley Chow, et al: White-Box Cryptography and an AES Implementation, 9th Annual International Workshop, SAC 2002, Aug. 15-16, 2002, pp. 1-18.
Stanley Chow, et al: A White-Box DES Implementation for DRM Applications, Digital Rights Management, ACM CCS-9 Workshop, DRM 2002, Washington DC, USA, Nov. 18, 2002.

*Primary Examiner* — Morshed Mehedi
(74) *Attorney, Agent, or Firm* — Hayes Soloway P.C.

(57) ABSTRACT

A method and system for verifying authenticity of at least part of an execution environment for executing a computer module is provided. The computer program module is operative to cause processing of digital input data in dependence on a plurality of predetermined digital parameters. At least part of one of the plurality of predetermined digital parameters is driven from the at least part of the execution environment.

25 Claims, 3 Drawing Sheets

(56) References Cited

U.S. PATENT DOCUMENTS

| | | |
|---|---|---|
| 2003/0191942 A1* | 10/2003 | Sinha et al. .................... 713/181 |
| 2003/0194085 A1* | 10/2003 | Dillaway ......................... 380/29 |
| 2005/0071653 A1* | 3/2005 | de Jong .......................... 713/189 |
| 2005/0278793 A1* | 12/2005 | Raley et al. ..................... 726/28 |
| 2006/0005251 A1* | 1/2006 | Wu et al. ......................... 726/26 |
| 2007/0113079 A1* | 5/2007 | Ito et al. ......................... 713/166 |
| 2008/0232582 A1* | 9/2008 | Chevallier-Mames et al. . 380/44 |

FOREIGN PATENT DOCUMENTS

| | | |
|---|---|---|
| WO | 9967918 A2 | 12/1999 |
| WO | 2005060147 A1 | 6/2005 |
| WO | 2006046187 A1 | 5/2006 |
| WO | 2007105126 A2 | 9/2007 |

\* cited by examiner

FIG. 3

METHOD AND SYSTEM FOR VERIFYING AUTHENTICITY OF AT LEAST PART OF AN EXECUTION ENVIRONMENT FOR EXECUTING A COMPUTER MODULE

FIELD OF THE INVENTION

The invention relates to a method of and a system for verifying authenticity of at least part of an execution environment for executing a computer program module.

BACKGROUND OF THE INVENTION

The Internet provides users with convenient and ubiquitous access to digital content. Because of the potential of the Internet as a powerful distribution channel, many consumer electronics (CE) products strive to directly access the Internet or to interoperate with the PC platform—the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

Typically, digital rights management systems use an encryption technique based on block ciphers that process the data stream in blocks using a sequence of encryption/decryption steps, referred to as rounds. During each round, a round-specific function is performed. The round-specific function may be based on a same round function that is executed under control of a round-specific sub-key. For many encryption systems, the round function can be specified using mapping tables or look-up tables. Even if no explicit tables were used, nevertheless frequently tables are used for different parts of the function for efficient execution in software of encryption/decryption functions. The computer code accesses or combines table values into the range value of the function. Instead of distributing keys, that may be user-specific, it becomes more interesting to distribute user specific algorithms instead of keys for encryption or decryption algorithms. These algorithms, most often functions (mappings), have to be obfuscated (hidden) in order to prevent redesign or prohibit the re-computation of elements that are key-like. On computers, tables accompanied with some computer code often represent these functions.

Content providers must deliver content to legitimate users across a hostile network to a community where not all users or devices can be trusted. In particular for the PC platform, the user must be assumed to have complete control of the hardware and software that provides access to the content, and an unlimited amount of time and resources to attack and bypass any content protection mechanisms. The software code that enforces the terms and conditions under which the content may be used must not be tampered with. The general approach in digital rights management for protected content distributed to PCs is to encrypt the digital content, for instance DES (Data Encryption Standard), AES (Advanced Encryption Standard), or using the method disclosed in WO9967918, and to use decryption keys.

Main areas of vulnerability of digital rights management (DRM) relying on encryption are the software plug-ins which enforce the terms and conditions under which the content may be used, the key distribution and handling, and the execution environment in which the DRM module is executed.

Typically, the plug-in enforces the terms and conditions under which the content is to be used. An attacker aiming to remove these terms and conditions may attempt to achieve this through tampering of the program code comprised in the software plug-in.

In relation to key handling, for playback a media player has to retrieve a decryption key from a license database. It then has to store this decryption key somewhere in memory for the decryption of the encrypted content. This leaves an attacker two options for an attack on the key. Firstly, reverse engineering of the license database access function could result in black box software (i.e., the attacker does not have to understand the internal workings of the software function), allowing the attacker to retrieve asset keys from all license databases. Secondly, by observation of the accesses to memory during content decryption, it is possible to retrieve the asset key. In both cases the key is considered to be compromised. Increasingly, keys and part of the decryption algorithm are represented as look-up (mapping) tables forming part of a software implementation. Making software tamper resistant has gained increasingly more attention.

Tamper-resistant software is so called because goal-directed tampering with the software is complicated. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the application, and consequently to change it.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by a combination of encoding its tables with random bijections representing compositions rather than individual steps, and extending the cryptographic boundary by pushing it out further into the containing application.

Whereas so far attention has focused on protecting the keys and the DRM module, it has become clear that it is also important that the execution environment is trustworthy. Much attention was given to this subject when as part of Sony's DRM installation (Extended Copy Protection XCP software) on a PC also some files of Windows XP were replaced in a way that the replacement could not easily be detected (hidden in the so-called root-kit of Windows XP). The replacement unintentionally exposed the PC to certain virus-like attacks. Blue-ray (BD) disc makes it possible to distribute protected content on a disc, together with a DRM software module to be executed on a virtual machine of the BD-player. The DRM software module may be content-specific and include key-like information for decrypting the content in any suitable form. Although certain methods exist for verifying authenticity of software (e.g. using signature schemes and trusted parties), so far software modules usually have to rely on the fact that the execution environment in itself is trustworthy.

SUMMARY OF THE INVENTION

It would be advantageous to have an improved method for verifying authenticity of at least part of an execution environment for executing a computer program module.

To better address this concern, in a first aspect of the invention a method is presented that comprises verifying authenticity of at least part of an execution environment for executing a computer program module, where the computer program module is operative to cause processing of digital input data in dependence on a plurality of predetermined digital parameters; and the method includes using a predetermined algorithm to derive at least part of one of the plurality of predetermined digital parameters from the at least part of the execution environment.

According to the invention, the computer program module in its execution depends on the execution environment. Its parameters are at least partially derived from the execution environment. A predetermined algorithm is used to derive such parameters from the execution environment. In this way, it can be assured that with a reasonable degree of probability the program module will only process its input data in a desired way if the verified part of the execution environment has not been tampered with. This gives at least an implied verification of the execution environment. Since the execution output of the program module inherently depends on the execution environment, it is difficult to tamper with that part of the execution environment. The execution environment may include part of an operating system (e.g. the kernel and/or important libraries), but may also include a virtual machine, such as a Java virtual machine, operating on top of an operating system. By verifying the execution environment in this way, it can be better avoided that valuable digital data, for example digital content such as audio and/or video, is leaked by a tampered execution environment. It is noted that it is known to perform some form of verification over software modules, e.g. in the form of a checksum, and verifying the outcome. Such techniques are open to various attacks, including trying to skip the test. According to the invention, a change in the verified part of the execution environment may imply a change in the parameters and as such cause a change in the output of the program module. For example, content may be decrypted wrongly. Tampering with the checked part of the execution environment becomes increasingly difficult if the relationship between the parameters is unclear to an attacker.

According to an aspect of the invention, the computer program module is only executed if the plurality of parameters meets a predetermined criterion. So, an explicit test may take place, for example by performing a checksum on the parameters. This has the advantage that a user can be warned that the execution environment has been tampered with. Without such a warning, a user may think that the computer program module is faulty since this module may not produce an expected output if its parameters are wrong. In an embodiment, for different parts of the execution environment respective test may be designed, such that the user can be informed which part of the environment is untrustworthy and/or should be replaced. Even if the test itself may be simple (e.g. based on an IF . . . THEN . . . ELSE or similar statement) and may be avoided by a person skilled in tampering, in systems where the test has not been tampered with, adequate information can be provided to a user. If so desired, also known techniques may be used for making the test more tamper-resistant.

According to an aspect of the invention, the verification is done by performing a run of at least part of the computer program module on predetermined digital input data using the plurality of parameters. It is then verified if the output of the trial-run meets a predetermined criterion. In this situation the parameters itself are not verified but the output produced with the parameters is verified. The output can depend on the entire set of parameters and chosen input data, making it more difficult for a hacker to determine the correct parameters.

In an embodiment, the predetermined digital input data is received from a server as a challenge; and the output of the run is provided to the server, enabling the server to perform the verification. For example, a bank may in this way first check if the system is still secure before continuing, e.g. by providing more data and/or software.

According to another aspect of the invention, the predetermined algorithm is implemented using computer executable instructions for converting a representation of the execution environment to the at least one parameter. By using a program to perform the representation, full flexibility can be achieved. For example, it can be freely determined which part of the execution environment is checked (e.g. which data elements in the environment, which computer executable instructions, etc.) and how that part is represented (e.g. simply copied, hashed, etc.). If so desired, any suitable technique may be used to obfuscate the software implementation of the algorithm.

According to an aspect of the invention, (part of) the executable instructions of the execution environment are unified with (part of) the parameter set of the computer software module. More in detail, a part of a bit representation of the plurality of parameters is equal to at least a part of a bit representation of computer executable instructions of the execution environment; and instructions of the computer program module are arranged for, during an execution, using at least one memory address holding the part of the bit representation of the instructions of the execution environment also for reading the equal part of the bit representation of the parameters by reference. So, at least one memory address has a 'double function'; it is used for storing a (part of) parameter for the software program module and for storing an instruction of the execution environment. So, tampering with this instruction will automatically result in tampering with the parameters, with the risk of causing the program module to no longer perform the desired processing. The executable instructions may be processor instructions, but may equally be other suitable instructions, such as virtual machine instructions or interpreted pseudo-code instructions. The virtual machine instructions may for example be Java or SPDC (Self Protecting Digital Content) compliant.

According to another aspect of the invention, (part of) the executable instructions of the computer program module are unified with (part of) the parameter set of the computer program module. More in detail, a part of a bit representation of the plurality of parameters is equal to at least a part of a bit representation of computer executable instructions of the computer program module; and wherein the instructions are arranged for, during an execution of the instructions, using at least one memory address holding the part of the bit representation of the instructions also for reading the equal part of the bit representation of the parameters by reference. In this way, the computer program module is also made more tamper-resistant. Tampering with an instruction of the module that is also used as a parameter will thus automatically result in tampering with the parameters, with the risk of causing the program module to no longer perform the desired processing.

According to an aspect of the invention, in addition to or as an alternative to representing instructions of the execution environment, the predetermined algorithm causes at least one data element of the execution environment to be used as one or more or part of the plurality of parameters. In this way also relevant parameters (e.g. constants) of the execution environment can be checked. For example, it can be verified if the regional code, such as known from DVD, has not been tampered with.

According to an aspect of the invention, the method is particularly useful if it is used in combination with a computer program module that processes valuable content. Such valuable content may, for example, be financial data (e.g. electronic banking) or digital content (e.g. audio and/or video). Valuable content is typically not distributed in a 'plain-text' format easily readable/useable by hackers. Typically, at least a cryptographic operation (e.g. encryption, authentication), encoding operation (e.g. compression), and/or scrambling operation has been performed on at least some of the input parameters. To this end, the plurality of digital parameters include a representation of at least one of the following:

cryptographic data, such as a cryptographic key and/or cryptographic algorithm;

digital content encoding/decoding data, such as a coding table and/or coding algorithm;

digital content scrambling/descrambling data, such as a scrambling table and/or scrambling algorithm.

In an embodiment, the digital input data is digital content that has been encrypted, encoded and/or scrambled under control of a content-specific key; the method including receiving a representation of the content specific key for controlling decryption, decoding and/or descrambling, respectively, and deriving at least part of one of the plurality of predetermined digital parameters from the received representation of the content-specific key. So, in this embodiment the parameters of the computer program module depend on a content-specific key as well as the execution environment, which typically changes less frequently than the content key. As described above, the parameters may also depend on the instructions of the computer program module. In this way a high level of security can be achieved while still maintaining the flexibility of using different content-specific keys and not having to update the computer program module and/or execution environment each time the content key changes.

In an embodiment, the derived part of the digital parameters includes a network of obfuscated look-up tables where at least one table has been obfuscated in dependence on the at least part of the execution environment and the algorithm is arranged to derive at least one compensating element from the at least part of the execution environment and insert the at least one compensating element in another one of the obfuscated look-up tables such that the network of obfuscated look-up tables is functionally equivalent to the network of look-up tables. In this way a white-box implementation of content-specific decryption can be achieved, where freedom in the choice of obfuscating is used to verify that the execution environment is correct. The execution environment is at least in part represented in the obfuscated tables. Only with that part of the execution environment being present can during execution the functionality of the original network of tables be achieved. For each content item, a content-specific key (and optionally content specific decryption algorithm) can be made. Only this needs to be distributed for each content item. The execution environment can be checked and, if so desired, also the computer program module can be checked. The execution environment and computer program module need only to be distributed once, whereas they can still be verified by being tied together through the obfuscating.

In a preferred embodiment, the parameters include constant values that have some redundancy in them, i.e., it is possible to compensate a change in one parameter by making an appropriate change to another parameter. For example, if certain executable instructions of the execution environment are highly relevant and need to be verified, these instructions can be represented in the parameters (e.g. simply be being unified). Other parameters are then chosen such to compensate for these given parameters in such a way that the implementation provides an equivalent functionality regardless of whether the original parameters (before the change) or the changed parameters are used.

BRIEF DESCRIPTION OF THE DRAWINGS

These and other aspects of the invention will be elucidated hereinafter by reference to the drawings, wherein.

DETAILED DESCRIPTION OF EMBODIMENTS

Figure 1:
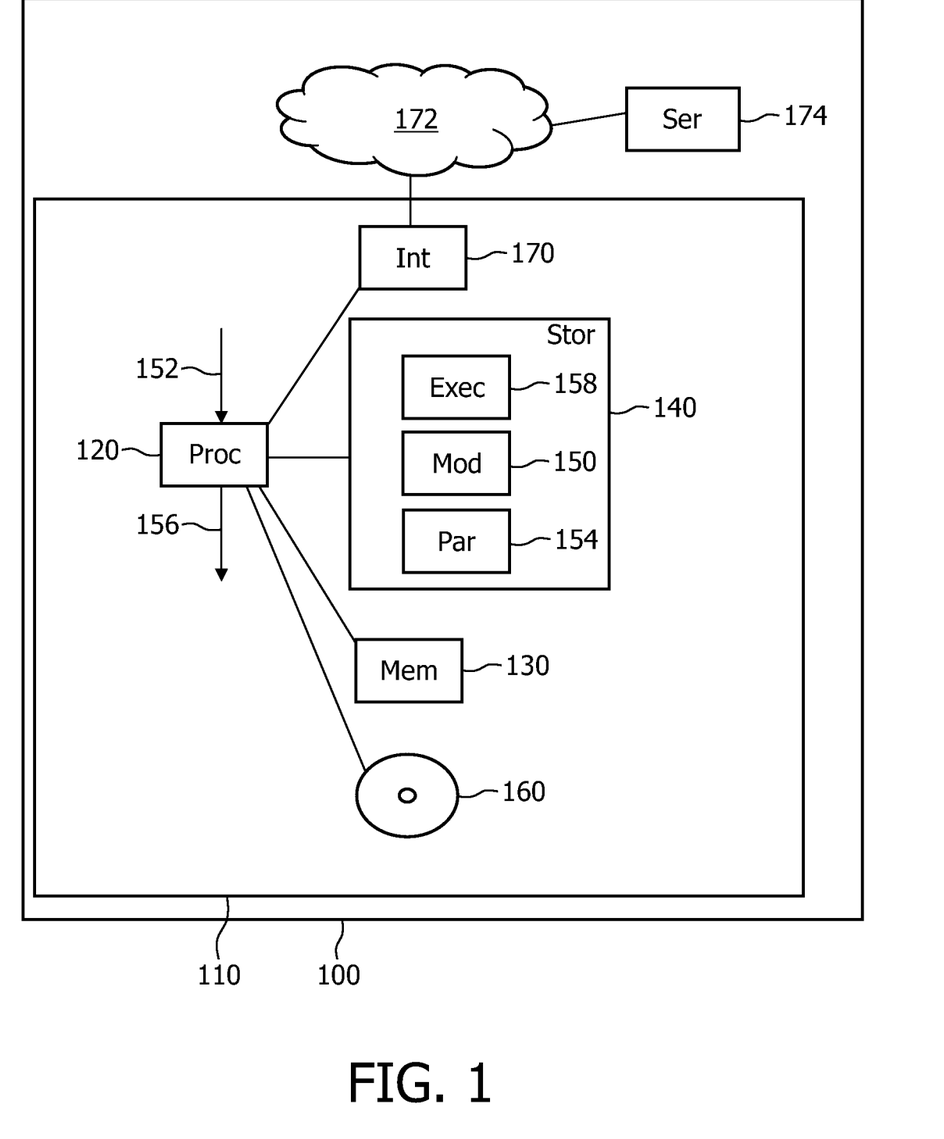
FIG. 1 shows a block diagram of a system in which the method may be used.

FIG. 1 shows a block diagram of an apparatus 110 in which the invention may be used. The apparatus 110 may be part of a larger system 100. The apparatus 110 is operated under control of software. Part of its functionality is included in one or more software program modules. To this end, the apparatus includes a processor 120. The apparatus may in itself be any suitable device, such as a personal computer, a dedicated media player (e.g. DVD, Blu-ray disc player, HD-DVD player), game machine (e.g. X-Box, Playstation). It may also be a portable device, such as a PDA, or smart phone. The processor 120 may be any suitable processor, such as a PC-type processor or embedded processor, including a digital signal processor (DSP). The apparatus may include a working memory 130, such as RAM, and a non-volatile storage 140, such as a hard disc, optical storage or flash memory. The apparatus includes a computer program module 150. When loaded into the processor 120, the computer program module 150 is operative to cause processing of digital input data 152 in dependence on a plurality of predetermined digital parameters 154. The output of the processing is digital output data 156. To be able to perform such processing, the computer program module 150 is loaded in an execution environment 158. Such an environment 158 may include an operating system kernel, libraries (e.g. media decoders, such as an MP3 or MPEG 4 decoder, internet protocols, etc.). The execution environment 158 itself (or at least the active part) is also executed by the processor 120. If, for example, the module 150 is a DRM module, the module 150 may include a media player as well as DRM-specific plug-ins for managing the digital rights and controlling the decryption/descrambling and/or decoding. Such media players may be able to execute, for a specific content format, a respective plug-in for performing the format-specific decoding corresponding to digital content. Those content formats may include AVI, DV, Motion JPEG, MPEG-1, MPEG-2, MPEG-4, WMV, Audio CD, MP3, WMA, WAV, AIFF/AIFC, AU, etc. For digital rights management purposes, a secure plug-in may be used that not only decodes the content but also decrypts and/or descrambles the content. It is a choice of the skilled person if part of such functionality is re-used and for that purpose is integrated into the execution environment 158. For example, the module 150 may use a media player from the execution environment and only operate as a plug-in in such media player, e.g. for performing specific operations, such as decryption or decoding. It will also be appreciated that the execution environment 158 may provide a virtual machine, such as Java, where the module 150 is code to be interpreted by the virtual machine. In FIG. 1 it is shown that the program module 150, its parameters 154 and the execution environment 158 are stored in storage 140. The program module 150 and/or its parameters 154 may also be stored elsewhere (e.g. stored on removable optical storage 160) or retrieved from outside the apparatus 110 on demand through a communication interface 170. For example, the interface 170 may give access to the internet 172. For example, digital content such as audio and/or video may be downloaded (being the input data 152) from a server 174 in the internet. The content may be protected through any suitable techniques such as encryption, scrambling, encoding (e.g. compression) so that the content is not available in a 'plain-text' form that can directly be used by malicious parties. The digital content may also be other digital data, in particular data worth protecting, such as a financial transaction (internet banking), where input is received through a communication network, like the internet, securely processed, and output through the communication network. As such, the output may also be supplied through a communication interface, like interface 170, to outside the apparatus 110, e.g. to a bank server, like server 174. As described above, the computer program module may also be retrieved from outside the apparatus 110. In an embodiment, at least part of the computer program module is designed specifically for processing the content. For example, the content may have been encrypted using a, preferably, unique key or content-specific key (e.g. each movie is encrypted with a movie-specific key). The computer program module may then have been designed so that it can decrypt this content. Similarly, for example, for a financial transaction a computer program module specific for that transaction may be provided under responsibility of a bank. The module can then process the financial data in a specific (preferably unique) way and may provide as part of the output also its identity. Various suitable watermarking techniques exist and may be used for merging such an identity with the output. The bank can then verify that a module with that identity has been used. During execution, the program module 150, the active part of the execution environment 158 and parameters 154 may be loaded in the working memory 130. The apparatus 110 may also include user input means (not shown), such as a remote control, keyboard, mouse, microphone for speech input, etc. to obtain commands from a user such as to indicate content to be rendered. The apparatus 110 may also include user output means (not shown), such as a display 93 and/or speakers for providing information to a user and/or for representing the rendered content.

According to the invention, a predetermined algorithm is used to derive at least part of one of the plurality of predetermined digital parameters 154 from the at least part of the execution environment 158. As will be described in more detail below, the parameters may additionally or alternatively also be derived from other parts, such as the program module 150 itself. It will be appreciated that to increase the security it may be desired to derive a higher number of bits of the parameters from the execution environment. It will also be appreciated that the complexity of the algorithm determines the number of bits to get a desired level of security. For instance, if the algorithm is based on a cryptographically strong hash that is determined over a main part of the execution environment then using 1024 bits of the parameters may already give a very strong security. As such only a part of a parameter, a part of several parameters (e.g. the most significant bits of several parameters), one parameter in its entirety, or several parameters in its entirety, or combinations hereof may be used. Similarly, only a small part of the execution environment may be checked (e.g. one or a few highly relevant instructions or constants), or a significant part may be checked (e.g. some relevant libraries). The person skilled in the art can determine which part of the execution environment needs to be checked (e.g. the part with the highest potential of leaking relevant data).

Figure 2:
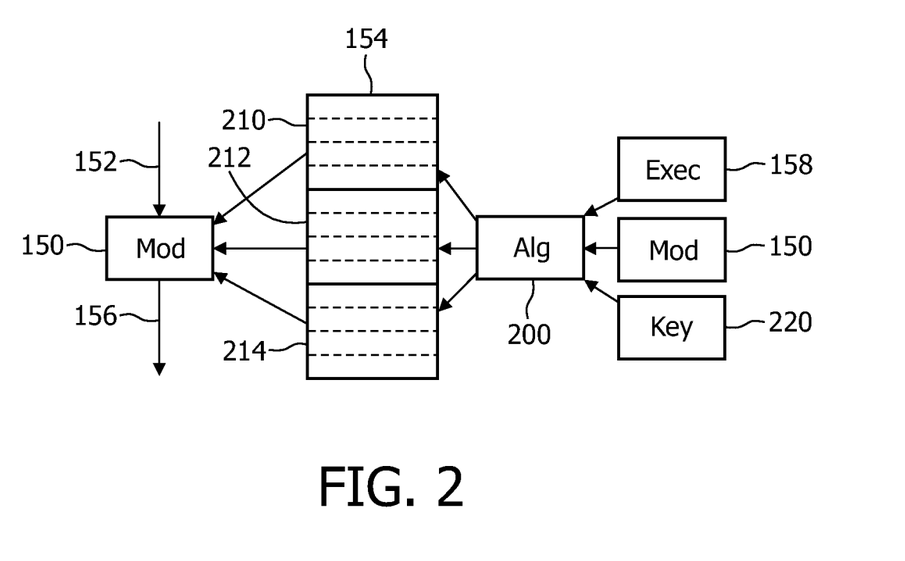
FIG. 2 shows details of the structure of the system.

FIG. 2 illustrates the principle further. Where in the figures same reference numerals are used, they refer to the same items possibly with more detail added. According to the invention a predetermined algorithm 200 is used for deriving at least part of one of the plurality of predetermined digital parameters 154 from the at least part of the execution environment 158. In FIG. 2 it is shown that part 210 of the parameters is derived from the execution environment 158. As will be described in more detail below, in embodiments of the invention, also a part 212 of the parameters may be derived from the program module 150 itself, and a part 214 may be derived from separately supplied parameters, such as a content specific decryption key 220. In itself, the parameters may be any type of parameters. For example, for signal processing of an audio/speech/video signal the parameters may be filter settings. For a cryptographic-like operation (e.g. decryption or authentication) or descrambling the parameters may represent key or key-like information. For decoding, the parameters may represent a decoding table. Typically, the parameters are constants used by the module 150 or the execution environment 158.

It is noted that it is known how to represent cryptographic and similar algorithms as one or more (typically a network of) mapping tables to be executed by software. For example, Chow 1 and Chow 2 describe such an approach for AES and DES, respectively. These tables represent key-like information as well as part of the algorithm. An advantage of using such tables is that time-consuming algorithmic steps are now replaced by a much faster mapping operation (at the cost of using more memory to store the tables). A detailed description of such an approach is also given in the co-pending patent application Ser. No. 61/166,930. In these so-called white-box software implementations of algorithms, it is assumed that a hacker may get access to such tables, for example when loaded into memory 130. Even if the tables were stored in an encrypted form in storage 140, at a certain moment the module 150 will have to use the actual decrypted table. In the white-box approach, in principle a malicious party can copy the entire software module and this may work also in another apparatus. Several approaches may be used to discourage this. For example, the tables may be so large that it becomes clumsy to copy them. Another approach is to let the tables represent information traceable to the original user. Any illegal copy can then also be traced back to the original user. Chow 1 and Chow 2 describe several approaches to make sure that the original tables are not available in a plain-text form. Instead these original tables are obfuscated. Preferably, the network of look-up tables is obfuscated by applying an encoding to the input and output of at least some of the tables. These encodings have an influence on the contents of the look-up table; changing the encoding changes the contents of the table in a predictable way. However, it may be difficult for an attacker to unravel the encodings as he only has knowledge of the final look-up table indicative of a mapping whose inputs and outputs have been encoded in a relatively complex way. The transformation applied to the elements of the look-up table can be realized by appropriately changing the encodings. By changing an output encoding, particular values may be incorporated in the table. By changing an input encoding, for example the order in which values appear in the table may be changed. Hereinafter, input encoding is also referred to as input decoding as it may decode the encoding of data caused by an output encoding of a preceding look-up table.

Figure 3:
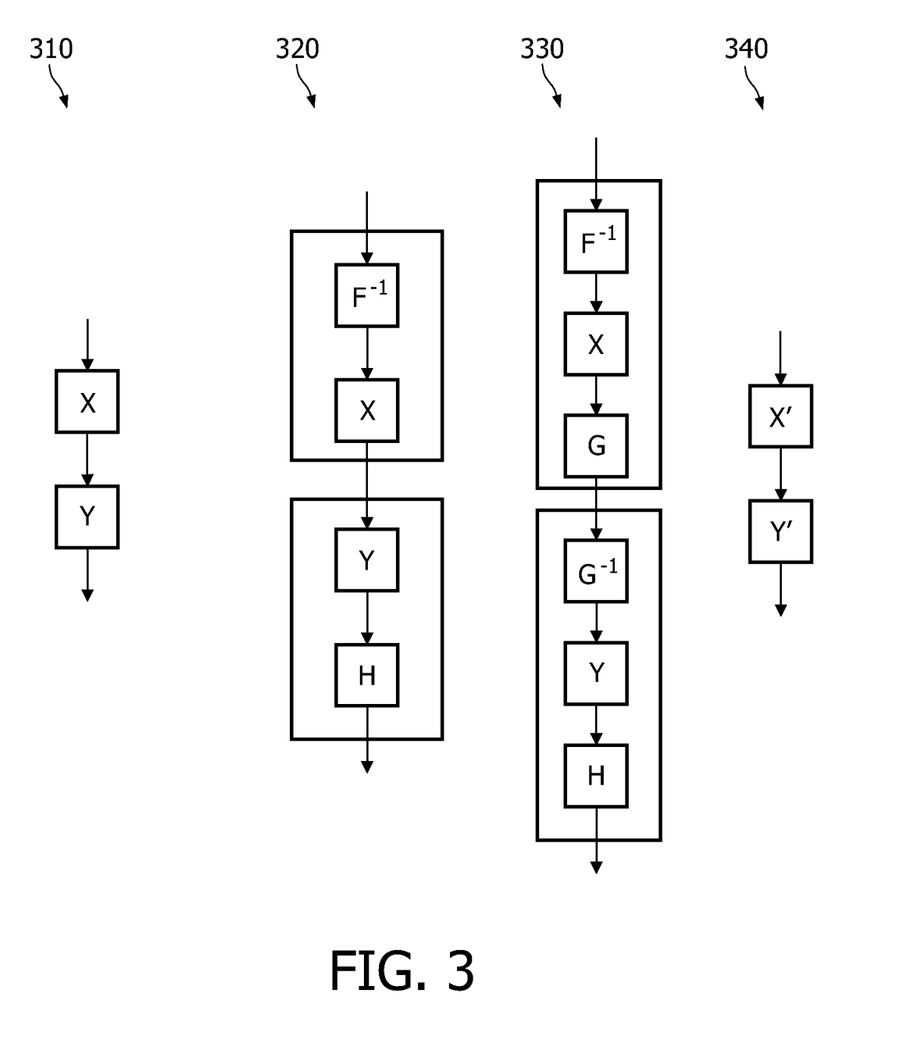
FIG. 3 shows examples of obfuscated a network of look-up tables.

A look-up table can be manipulated with most freedom by changing both the input and output encodings. Considering at least three look-up tables when changing allows to change the input and output encodings of at least one table. Such changes may be compensated for by changing encodings of at least two other tables. FIG. 3 illustrates a way to make it even more difficult to extract the key. Let X and Y be two functions. Consider an operation $Y \circ X = Y(X(c))$ (which may also be indicated as $Y*X(c)=Y(X(c))$), illustrated as diagram 310, where c is an input value, for example a 4-byte state column. However, the approach applies to any type of input value c. Mappings X and Y can be implemented as look-up tables which can be stored in memory, however, when they are stored in memory the values can be read by an attacker. Diagram 320 illustrates how the contents of the look-up tables can be obfuscated by using an input encoding F and an output encoding H. Look-up tables corresponding to $X \circ F^{-1}$ and $H \circ Y$ are stored as illustrated instead of X and Y, making it more difficult to extract X and Y. Diagram 330 shows how to add an additional, for example random, bijective function G, such that the intermediate result of the two tables is also encoded. In this case, two tables are stored in memory: $X' = G \circ X \circ F^{-1}$ and $Y' = H \circ Y \circ G^{-1}$. This is illustrated once more in diagram 340:

$$Y' \circ X' = (H \circ Y \circ G^{-1}) \circ (G \circ X \circ F^{-1}) = H \circ (Y \circ X) \circ F^{-1},$$

where $\circ$ denotes function composition as usual (i.e., for any two functions $f(x)$ and $g(x)$, $f \circ g(x) = f(g(x))$ by definition), X and Y are functions suitable for implementation by means of look-up tables. Likewise a network consisting of more than two functions can be encoded. The actual tables encoding X and Y are obfuscated by combining $H \circ Y \circ G^{-1}$ in a single look-up table and combining $G \circ X \circ F^{-1}$ in a single look-up table. As long as F, G, and/or H remain unknown, the attacker cannot extract information about X and/or Y from the look-up tables, and hence the attacker cannot extract the key that is the basis for X and/or Y. Other algorithms may also be implemented as a (cascade or network of) look-up tables that may be obfuscated in a way similar to the above. The invention is not limited to the exemplary cryptographic algorithms mentioned.

The advantage of using such tables is that a significant part of the function performed by module 150 in fact is represented as data; in this case as parameters. As such, a sufficient number of parameters may be present to enable thorough checking of the execution environment 158. It will be appreciated that the approach can still work if fewer parameters are used. So, using such mapping tables is not required but it is an advantage if they are used.

Normally, the program module 150 will have been designed to use specific predetermined parameter values. According to the invention, those parameters are at least in part derived from the execution environment 158. Without precaution, the module may not operate correctly using such a derived parameter. The module can easily be designed such that it still generates the desired outcome. For example, if the module was designed to use a parameter (e.g. constant) $z_1$, and the algorithm 200 generates a value $z_2$ based on a correct version of the execution environment 158, then the module 150 may be designed such that it uses a parameter $z_3$ XOR $z_2$ (where XOR is a bit-wise exclusive or), where $z_3$ is loaded as a constant in the parameters 154 and has been pre-computed as being $z_1$ XOR $z_2$. The module will then calculate $z_3$ XOR $z_2$ and if the execution environment has not been tampered with the algorithm 200 will generate the original value of $z_2$. Since $z_3$ has been pre-computed as $z_1$ XOR $z_2$, the module thus calculates $z_3$ XOR $z_2 = (z_1$ XOR $z_2)$XOR $z_2 = z_1$. In this way, a form of compensation is achieved so that on the one hand the module 150 during execution effectively uses the original parameters (e.g. $z_1$) and on the other hand other parts can be verified while being expressed as parameters (e.g. $z_2$). In this example, the parameter $z_3$ purely functions as a compensation.

Particularly, if the more advanced techniques of networks of obfuscated tables are used, more freedom is achieved in compensating for having to check parameters derived from for example the execution environment 158 while still using a correct set of parameters. For example, in an embodiment the module 150 and/or part of the execution environment 158 may be partially implemented using mapping tables, particularly a network of look-up tables.

In an embodiment, the look-up tables may be obfuscated using output and/or input encodings. For example a first look-up table $f(t_1(x))$ in the network of look-up tables has output encoding $f$. A second look-up table $t_2(f^{-1}(x))$ in the network of look-up tables has an input decoding $f^{-1}$. The input decoding $f$ inverts an effect of the output encoding, for example $t_2(f^{-1}(f(t_1(x)))) = t_2(t_1(x))$. A special feature of this is that the decodings $f$ and $f^{-1}$ may be chosen such that a predetermined word is included in the first look-up table $f(t_1(x))$ or the second look-up table $t_2(f^{-1}(x))$. Let for example $t_1(x_0) = y_0$. To include the word w in the look-up table, $f$ can be chosen such that $f(y_0) = w$, because in that case $f(t_1(x)) = f(y_0) = w$. This will put w at position $x_0$ in the first look-up table. To compensate, $f^{-1}$ is chosen such that $f^{-1}(w) = y_0$.

This feature can be used to verify the execution environment. For example, let the tables $t_1$ and $t_2$ represent original (not disclosed) tables of the module 150. Let processing of the execution environment 158 by the algorithm 200 give the value w. Then the obfuscated first and second tables $f(t_1(x))$ and $t_2(f^{-1}(x))$ can be determined. Instead of supplying such tables in its entirety as parameters 154, in the first table the word w can be left out. The algorithm 200 has to generate the word w based on the actual execution environment 158 and insert it at the appropriate place in the first look-up table. Only if the correct word w is inserted at the correct place in the table, will the combination of the obfuscated tables produce the same output as the combination of the original tables $t_1$ and $t_2$. In this example, tables (more in general parameters) of the module 150 are obfuscated using knowledge of the execution environment. As such, the execution environment is verified. If the execution environment is correct, the obfuscated module will perform correctly. Compared to the example of $z_1$, $z_2$, and $z_3$, given above, $z_2$ can be seen as word w. By using a network of tables, the compensation $z_3$ does not require an additional parameter but can be incorporated in one of the other tables.

WO 2006/046187 and WO 2005/060147 of Koninklijke Philips Electronics disclose several methods of obfuscating a network of tables. In WO 2006/046187, an obfuscating table O and a compensating table C are used. At least one original table is obfuscated with table O and at least one of the other original tables is obfuscated with table C. The freedom in choosing such table O can be used to represent the execution environment in table O and use table O to obfuscate at least one original table of the program module. The execution environment will then automatically also be represented in the compensating table C. Instead of fully obfuscating an original table fully with O and another fully with C, one or more elements of these tables may be left unmodified. For example, a certain element may be obfuscated using O but the compensating element in the other table is not compensated with C. The algorithm 200 can then construct the missing compensating element of table C based on the actual execution environment, and XOR that over the involved table, so that during execution the compensation is achieved.

In WO 2005/060147 permutations $p_i$ are used for the obfuscation. Here again, $p_i$ may be derived from the execution environment. The tables obfuscated with $P_2i$ and $P_{2i+1}$ may again be only 'half' obfuscated (at least one element of $p_2i$ or of $p_{2i+1}$) is not used in the sense that the compensating effect in the total network of obfuscated tables is not achieved. The algorithm is then used to generate this missing compensating element based on the actual execution environment.

It will be appreciated that in principle any part of the execution environment may be verified. For example, one or more computer instructions or parts of it may be verified by directly being used as parameters (e.g. the word w mentioned above). The same holds for data (e.g. a constant, such as a regional code used in a DVD player) in the execution environment. The algorithm 200 may use the instruction/data as a literal copy, but may also calculate a representation. In an embodiment, the algorithm calculates a hash of (part of) the execution environment and uses the hash as the basis for a parameter. For example, the hash may form the word w. Any suitable hash may be used.

In an embodiment according to the invention, the computer program module is only executed if the plurality of parameters meets a predetermined criterion. A simple test may be performed, such as calculating hash over the parameters 154 and checking if this gives the desired value that has once been pre-computed based on the correct set of parameters. If the test shows that the parameter set is incorrect, the user may be warned. Also separate parts of the parameters, such as parts 210, 212 and 214, may be separately tested. In this way detailed information can be given to the user on which part is no longer correct. This pre-test is mainly used as warning of the user that the output of the module 150 will probably be incorrect. As such the module may still be executed. In itself it is no problem if a malicious party removes the test, since the real verification is obtained as correct output 156 of the module 150. Standard obfuscation techniques may be used to make it more difficult for a hacker to find and remove the test.

In an embodiment, instead of or in addition to explicitly verifying the parameter set, a trial-run is performed of at least part of the computer program module 150 on predetermined digital input data 152 using the plurality of parameters 154 and verifying whether an output 156 of the trial-run meets a predetermined criterion. The criterion may simply be that the trial run gives the output that has been achieved using an original module 150, that is executed in an original execution environment 158 with the original algorithm 200, and the same predetermined digital input data as will be used later on during the test. Again, the test itself may be obfuscated using conventional techniques. In an embodiment, the predetermined digital input data is received from a server, such as server 174, as a challenge. The output of the run is provided to the server, enabling the server to perform the verification. For example, a bank may in this way first check if the system is still secure before continuing, e.g. by providing more data and/or software. The verification needs then not be done (but may also be additionally done) in apparatus 110.

In an embodiment, the predetermined algorithm 200 is implemented using computer executable instructions for converting a representation of the execution environment 158 to the at least one parameter 154. In this way, the algorithm 200 can implement complex operations to obfuscate how the execution environment 158 is represented in the parameters 154. For example, the algorithm 200 may include scrambling, encrypting, compressing, and/or hashing operations. The algorithm itself may be obfuscated using any suitable technique, such as white-box techniques as disclosed in Chow 1 and/or Chow 2. In an embodiment, the algorithm is supplied in combination with the module 150. As such, the algorithm may also be part of the module 150. For example, it may form part of an initialization routine of the module 150 that creates at least some of the parameters of the module 150. It will be appreciated that the algorithm 200 may also be very simple. For example, the algorithm could be a set of pointers provided in the module 150 that point to data or instructions in the execution module 158 that are to be used (e.g. copied) as parameters of the module 150. Any suitable form of pointers may be used, such as absolute value or relative value. Such choices fall within the abilities of a person skilled in the art. Thus, in an embodiment, the predetermined algorithm 200 causes at least one data element of the execution environment to be used as one or more or part of the plurality of parameters. It will be appreciated that the algorithm 200 may be implemented in hardware instead of software.

In an aspect of the invention, computer executable instructions of the execution module 158 and/or module 150 are unified with the parameters 154. This means that certain bit locations in memory 130 act as a parameter for the module 150 as well as an instruction (of the execution environment 158 or the module 150) executed by the processor 120.

In an embodiment, a unification between a parameter 210 and the execution environment 158 has occurred. A part of a bit representation of the plurality of parameters 210 is equal to at least a part of a bit representation of computer executable instructions of the execution environment 158. This means that those instructions of the execution environment are loaded for execution from a same memory location in memory 130 as is used by instructions of the module 150 to retrieve parameters from. It will be appreciated that one or more entire instructions of the execution environment may in this way also be used as parameters. If so desired also only parts of the execution instructions (e.g. operator field, most significant byte, etc.) may be unified with the parameters.

In an embodiment, a unification between a parameter 212 and the module 150 has occurred. A part of a bit representation of the plurality of parameters 212 is equal to at least a part of a bit representation of computer executable instructions of the computer program module 150. These instructions are arranged for, during an execution of the instructions, using at least one memory address holding the part of the bit representation of the instructions also for reading the equal part of the bit representation of the parameters by reference. Thus there is at least one instruction of the module 150 that is loaded from a certain memory location from which another instruction in the module 150 retrieves a parameter. Of course instead of loading an entire instruction or parameter the same principle also works for parts thereof.

In an embodiment, the plurality of digital parameters include a representation of at least one of the following:
cryptographic data, such as a cryptographic key and/or cryptographic algorithm;
digital content encoding/decoding data, such as a coding table and/or coding algorithm;
digital content scrambling/descrambling data, such as a scrambling table and/or scrambling algorithm.

In a further embodiment, the digital input data 152 is digital content, such as audio/video, that has been encrypted, encoded and/or scrambled under control of a content-specific key. The module 150 then causes the processor 120 to convert the digital input data to a plain-text form (or to at least a partially converted form) in which it can be rendered to a user or can be processed further. To this end, the method includes receiving a representation of the content specific key for controlling decryption, decoding and/or descrambling, respectively. For example, if the content has been encrypted, the apparatus 110 receives a decryption key. It may receive this in any way, e.g. read it from the storage 160 or receive it from a server 174 through the internet 172. The algorithm 200 is then used to derive at least part of one of the plurality of predetermined digital parameters 214 from the received representation of the content-specific key. For example, the content-specific key may simply be used as the parameter part 214.

In an embodiment, the content-specific key and/or the content-specific decryption algorithm is supplied in a form including a network of obfuscated look-up tables, for example in a way as described above. As indicated there, the obfuscation gives a certain freedom in choosing constants in the tables. Above an example was given where a word w derived from the execution environment 158 could be compensated for in another obfuscated table (and as such in another parameter of module 150). In an embodiment, a parameter derived from the execution environment 158 (e.g. word w) is compensated in the obfuscated implementation of the content-specific decryption key/algorithm 220. Algorithm 200 is then arranged to load the parameter derived from the execution environment 158 (e.g. word w) in the right place in the right obfuscated table. The network of obfuscated tables, used as parameters 154, will then compensate each other and perform the originally intended mapping. The content-specific decryption is thus obfuscated with the information derived from the execution environment. Only if that part is present in an unmodified form can it be guaranteed that the decryption performs correctly. It will be appreciated that the same principle will also work for content-specific coding and/or scrambling. It will also be appreciated that in a same way the content-specific parameters/algorithm may be obfuscated with information derived from the module 150 (e.g. word w is derived therefrom).

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor memory, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method comprising:
deriving at least part of a plurality of digital parameters from at least part of an execution environment for executing a computer program module, by using a predetermined algorithm; and
verifying authenticity of the at least part of the execution environment based on the at least part of the plurality of digital parameters driven from the at least part of the execution environment, where the computer program module is operative to cause processing of digital input data in dependence on the plurality of digital parameters,
wherein the derived part of the digital parameters includes a network of obfuscated look-up tables where at least one table has been obfuscated in dependence on the at least part of the execution environment,
wherein at least one compensating element is inserted in another one of the obfuscated look-up tables such that the network of obfuscated look-up tables is functionally equivalent to the network of look-up tables.

2. The method as claimed in claim 1, including only executing the computer program module if the plurality of digital parameters meet a predetermined criterion.

3. The method as claimed in claim 1, wherein the verifying authenticity of the at least part of the execution environment comprises:
providing predetermined digital input data to the computer program module for processing;
performing at least one run of at least part of the computer program module on the predetermined digital input data using the plurality of parameters; and
performing the verification of the at least part of the execution environment based on whether an output of the run meets a predetermined criterion.

4. The method as claimed in claim 3, wherein the verifying authenticity of the at least part of the execution environment comprises:
receiving the predetermined digital input data from a server as a challenge; and providing the output of the run to the server, enabling the server to perform the verification.

5. The method as claimed in claim 1, wherein the predetermined algorithm is implemented using computer executable instructions for converting a representation of the execution environment to the at least one parameter.

6. The method as claimed in claim 1, wherein a part of a bit representation of the plurality of parameters is equal to at least a part of a bit representation of computer executable instructions of the execution environment; and wherein instructions of the computer program module are arranged for, during an execution, using at least one memory address holding the part of the bit representation of the instructions of the execution environment also for reading the equal part of the bit representation of the parameters by reference.

7. The method as claimed in claim 1, wherein a part of a bit representation of the plurality of parameters is equal to at least a part of a bit representation of computer executable instructions of the computer program module; and wherein the instructions are arranged for, during an execution of the instructions, using at least one memory address holding the part of the bit representation of the instructions also for reading the equal part of the bit representation of the parameters by reference.

8. The method as claimed in claim 1, wherein the predetermined algorithm causes at least one data element of the execution environment to be used as one or more or part of the plurality of parameters.

9. The method as claimed in claim 1, wherein the plurality of digital parameters include a representation of at least one of the following:
cryptographic data;
digital content encoding/decoding data;
digital content scrambling/descrambling data.

10. The method as claimed in claim 8, wherein the digital input data is digital content encrypted, encoded and/or scrambled under control of a content-specific key; the method including receiving a representation of the content specific key for controlling decryption, decoding and/or descrambling, respectively, and deriving at least part of one of the plurality of predetermined digital parameters from the received representation of the content-specific key.

11. The method as claimed in claim 8, wherein the algorithm is arranged to derive the at least one compensating element from the at least part of the execution environment and insert the at least one compensating element in the another one of the obfuscated look-up tables such that the network of obfuscated look-up tables is functionally equivalent to the network of look-up tables.

12. A system for verifying authenticity of at least part of an execution environment for executing a computer program module, the system comprising:
a processor and a storage for storing the computer program module and the execution environment, wherein the computer program module is operative to cause the processor to process digital input data in dependence on a plurality of digital parameters; and
wherein the system includes:
a module for deriving at least part of the plurality of digital parameters from the at least part of the execution environment; and
a module for verifying authenticity of the at least part of the execution environment based on the at least part of the plurality parameters derived by the deriving module,
wherein the derived part of the digital parameters includes a network of obfuscated look-up tables where at least one table has been obfuscated in dependence on the at least part of the execution environment,
wherein the at least one compensating element is inserted in another one of the obfuscated look-up tables such that the network of obfuscated look-up tables is functionally equivalent to the network of look-up tables.

13. A non-transitory computer readable medium storing one or more programs, the one or more programs comprising instructions, which when executed by a processor, cause the processor to perform a method comprising:
deriving at least part of a plurality of digital parameters from at least part of an execution environment for executing a computer program; and
verifying authenticity of the at least part of the execution environment based on the at least part of the plurality of digital parameters driven from the at least part of the execution environment, where the computer program module is operative to cause processing of digital input data in dependence on the plurality of digital parameters,
wherein the derived part of the digital parameters includes a network of obfuscated look-up tables where at least one table has been obfuscated in dependence on the at least part of the execution environment,
wherein the at least one compensating element is inserted in another one of the obfuscated look-up tables such that the network of obfuscated look-up tables is functionally equivalent to the network of look-up tables.

14. The method as claimed in claim 9, wherein the cryptographic data comprises a cryptographic key and/or cryptographic algorithm.

15. The method as claimed in claim 9, wherein the digital content encoding/decoding data comprises a coding table and/or coding algorithm.

16. The method as claimed in claim 9, wherein the digital content scrambling/descrambling data comprises a scrambling table and/or scrambling algorithm.

17. The system as claimed in claim 12, wherein the module for verifying authenticity of the at least part of the execution environment is configured to implement one or more of:
performing the verification based on whether the plurality of parameters meet a first predetermined criteria; or
performing at least one run of at least part of the computer program module on predetermined digital input data using the plurality of parameters, and performing the verification based on whether an output of the run meets a second predetermined criterion.

18. The non-transitory computer readable medium as claimed in claim 13, wherein the verifying authenticity of the at least part of the execution environment comprises one or more of:
performing the verification based on whether the at least part of one of the plurality of parameters meet a first predetermined criteria; or
performing at least one run of at least part of the computer program module on predetermined digital input data using the plurality of parameters, and performing the verification based on whether an output of the run meets a second predetermined criterion.

19. The method as claimed in claim 1, wherein the at least one compensating element is driven from the at least part of the execution environment.

20. The system as claimed in claim 12, wherein the at least one compensating element is driven from the at least part of the execution environment.

21. The non-transitory computer readable medium as claimed in claim 13, wherein the at least one compensating element is driven from the at least part of the execution environment.

22. The method as claimed in claim 12, comprising a module for deriving the at least one compensating element from the at least part of the execution environment and inserting the at least one compensating element in the another one of the obfuscated look-up tables such that the network of obfuscated look-up tables is functionally equivalent to the network of look-up tables.

23. The non-transitory computer readable medium as claimed in claim 13, wherein the method comprising:
   deriving the at least one compensating element from the at least part of the execution environment; and
   inserting the at least one compensating element in the another one of the obfuscated look-up tables such that the network of obfuscated look-up tables is functionally equivalent to the network of look-up tables.

24. A method comprising:
   verifying authenticity of an execution environment for executing a computer program module, the computer program module being operative to cause processing of digital input data using a first parameter, comprising:
      deriving a second parameter from a current version of the execution environment and inserting the second parameter into a first look-up table of a network of obfuscated look-up tables; and
      incorporating a third parameter into a second look-up table of the network of obfuscated look-up tables,
      the third parameter being driven from the first parameter and a correct version of the execution environment, and acting as a compensating element so that the network of obfuscated look-up tables is functionally equivalent to a network of look-up tables.

25. A non-transitory computer readable medium storing one or more programs, the one or more programs comprising instructions, which when executed by a processor, cause the processor to perform a method comprising:
   verifying authenticity of an execution environment for executing a computer program module, the computer program module being operative to cause processing of digital input data using a first parameter, comprising:
      deriving a second parameter from a current version of the execution environment and inserting the second parameter into a first look-up table of a network of obfuscated look-up tables; and
      incorporating a third parameter into a second look-up table of the network of obfuscated look-up tables,
      the third parameter being driven from the first parameter and a correct version of the execution environment, and acting as a compensating element so that the network of obfuscated look-up tables is functionally equivalent to a network of look-up tables.

* * * * *

UNITED STATES PATENT AND TRADEMARK OFFICE
CERTIFICATE OF CORRECTION

| | | |
|---|---|---|
| PATENT NO. | : 8,700,915 B2 | Page 1 of 1 |
| APPLICATION NO. | : 12/307942 | |
| DATED | : April 15, 2014 | |
| INVENTOR(S) | : Michiels et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this
Eleventh Day of August, 2015

Michelle K. Lee
*Director of the United States Patent and Trademark Office*